UNITED STATES PATENT OFFICE.

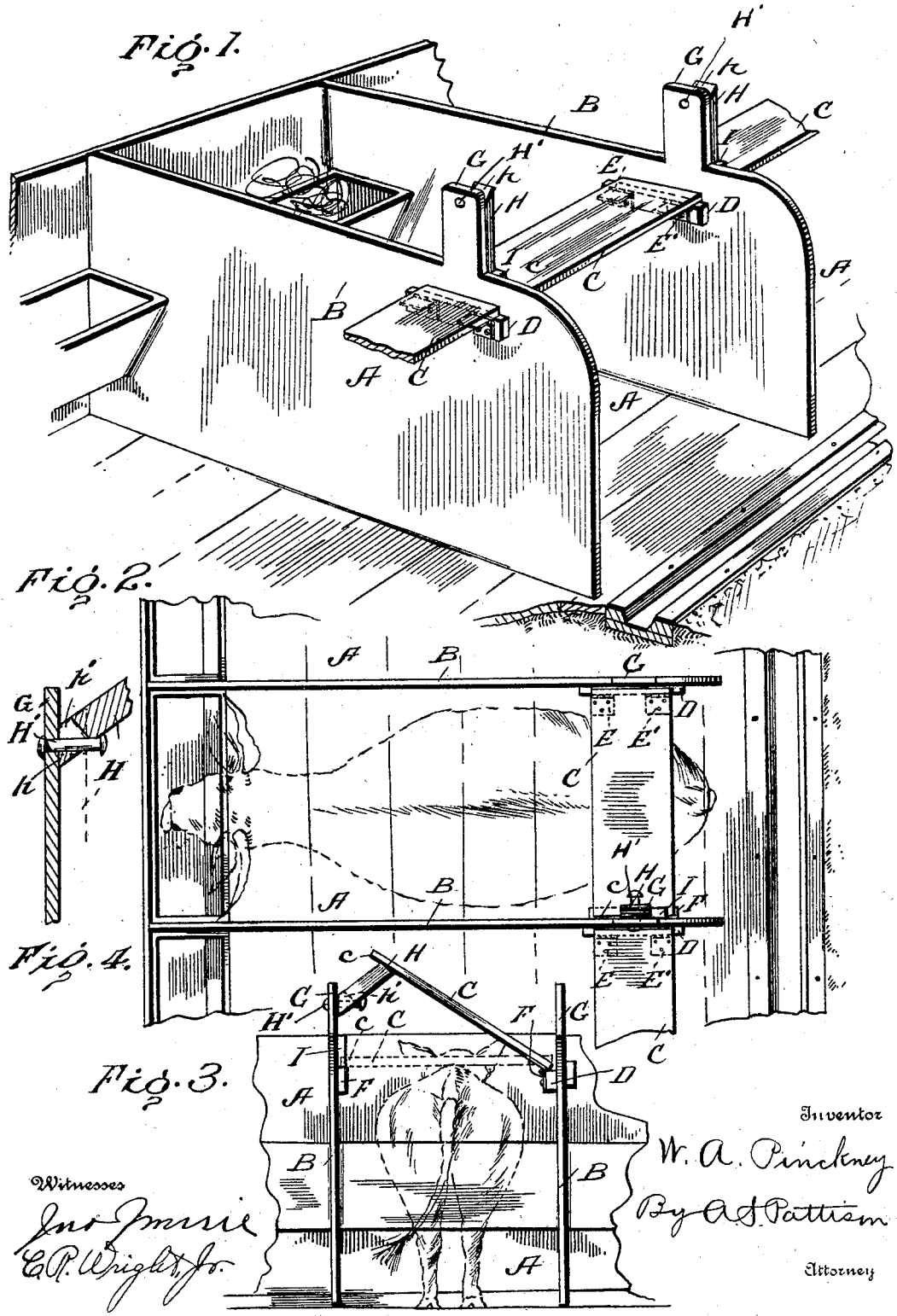

WILLIAM A. PINCKNEY, OF STANTON, MICHIGAN.

CATTLE-STALL.

No. 795,645.  Specification of Letters Patent.  Patented July 25, 1905.

Application filed January 19, 1905. Serial No. 241,797.

*To all whom it may concern:*

Be it known that I, WILLIAM A. PINCKNEY, a citizen of the United States, residing at Stanton, in the county of Montcalm and State of Michigan, have invented certain new and useful Improvements in Cattle-Stalls, of which the following is a specification, reference being had therein to the accompanying drawings.

My invention relates to improvements in cattle-stalls.

The object of my invention is to provide a stall with an attachment which will prevent cattle from dropping the dung in that portion of the stall in which the animal lies down, and thus keeping the stall and cattle comparatively clean.

Another object of my invention is to provide a more simple and effective device of this character and one in which when not in use is thrown upwardly and held in said position out of the way.

In the accompanying drawings, Figure 1 is a rear end perspective view of a stall, showing my device applied thereto. Fig. 2 is a top plan view of Fig. 1; and Fig. 3 is an end view of the stall, showing the device thrown upwardly and supported in said position out of the way. Fig. 4 is an enlarged sectional view of the connection between the swinging bar and the side of the stall.

Referring now to the drawings, A represents the stall, which is of the usual width and length and is provided at its forward end with the manger, which may be of any desired structure, as this and the structure of the stall form no part of my invention. The sides B of the stall are preferably made of a height considerably greater than that of the cattle, thus allowing a ready attachment of my device.

It is a known fact with cattle that they hump their backs when they dung, and they will not dung unless they can get their backs in such a position. In order to prevent the cattle from humping their backs up when standing in their normal position within the stall, I provide a hinged wide bar C, which is of a height to just miss the backs of the cattle when standing in their normal position. The said bar C is preferably of a width of about twelve to fourteen inches and is secured to a cleat D by means of two hinges E and E', the said cleat being rigidly supported by the side B of the stall, and thus it will be seen that the bar C can be readily swung upwardly. The stall on the opposite side from the cleat D is provided with a horizontal cleat F, which is of the same height as the cleat C', upon which rests the outer free end c of the bar C. The side of the stall above the cleat F is provided with an upwardly-extending arm G, which extends considerably above the side B of the stall—say, about two to three feet.

Pivotally connected to the upper end of the arm G is a swinging catch or lock H, which when in its normally downward position engages the end c of the bar C and prevents the same from being raised when the animal humps its back.

The side of the stall B adjacent the cleat F and in the rear thereof is provided with a vertically-disposed strip I, which serves as a stop to limit the backward swinging movement of the lock or swinging catch H. The upper end of the catch or lock H is beveled on the outside, as shown at $h$, and passing through said beveled portion $h$ and the upper end of the arm G is a pivot H', which allows the lock to be pivotally supported in a vertical position with its lower end above the upper face of the bar C. The beveled end of the catch H is provided with an elongated or enlarged opening $h'$ and through which passes the bolt H', which allows of the outward movement of the catch H when it is swung upward. When the said catch or lock H is oscillated on the pivot H' upwardly to allow the bar C to be raised to either allow the cattle to be driven in or out of the stall, the said bar is supported in said raised position by the lock H, which by the beveled portion $h$ the same is allowed to swing outwardly under the bar C, as shown in Fig. 3, and the bar is supported in said position. The said lock or catch will be held in said position by its own weight, and the bar C being firmly hinged to the side of the stall by two hinges there will be no tilting action thereof, and they will be firmly held in said position and would not be disturbed by the animal striking said bar with its horns or in any other manner.

When the bar C is in the position as shown in Fig. 1, the animal in order to dung will have to move back a couple of feet to raise its back to dung, and thus the same will be dropped back of that portion of the stall in which the cattle lie, and the stalls and cattle are more readily kept clean.

The width of the bar C is of great advantage, as it not only prevents the cattle from moving forward beyond the same, but also causes the cattle to move back a greater distance than if a narrow bar were used.

Having thus described my invention, what I claim, and desire to secure by Letters Patent, is—

1. A stall, comprising side walls, a transverse broad bar swinging across the stall above the back of the cattle, a lock for holding the bar in its downward position, and said lock also adapted to hold said bar in an upward position.

2. A stall comprising side walls, a transverse broad bar having two hinges connecting it to one side of the stall, a cleat carried by the opposite side wall and adapted to support the free end of the bar and a pivoted lock adapted to hold the free end of the bar on said cleat against upward movement.

3. A stall, comprising side walls, a transverse broad bar having one end hinged to one side wall of the stall and the opposite end resting upon a cleat carried by the opposite side wall, a pivoted catch swinging down and holding the free end of the bar on the cleat and adapted to swing upwardly and outwardly for supporting the bar in an upward position.

4. A stall, comprising side walls, a broad bar hinged to one side of the stall, and having the free end resting upon a cleat carried by the opposite side wall, a lock pivotally connected to the side wall above the cleat and having a beveled upper end through which the pivot passes, whereby when it is swung downward it holds the bar on the cleat and when swung upward and outward it supports the bar in its upward position.

5. A stall, comprising side walls, a cleat carried by one side wall, a broad flat bar hinged to said cleat from its under side by a pair of hinges, a cleat carried by the opposite side wall and adapted to support the free end of the bar, a latch having its upper inner edge beveled, a pivot passing through said beveled portion and securing the same to the side of the stall, whereby the same is swung downwardly for holding the free end of the bar on the cleat and when swung upwardly and outwardly in a line of travel of the hinged bar and is adapted to support the same in an upward position.

6. A stall, comprising side walls, a cleat carried by one side wall, a broad flat bar hinged to said cleat from its under side by a pair of hinges, a cleat carried by the opposite side wall and adapted to support the free end of the bar, a stop adjacent the rear end of said cleat, an upwardly-extending arm carried by the side wall above the last-named cleat, an elongated latch having its upper inner edge beveled, a pivot passing through the beveled portion and through the upper end of the arm, whereby the same normally swings downward for holding the free end of the bar on the cleat and when swung upwardly and outwardly in a line of travel of the hinged bar is adapted to support the same in an upward position.

7. A stall, comprising side walls, a transverse broad bar swinging across the stall above the back of the cattle, and a pivoted lock adapted to hold the bar in a downward or upward position.

8. A stall, comprising side walls, a transverse broad bar swinging across the stall above the back of the cattle, and a pivoted lock which when swung upward holds the bar in an upward position and when swung downward, holds the bar in a downward position.

9. A stall, comprising side walls, a transverse bar having a hinge connection with one side wall, and a catch having an elongated opening through the same and a bolt carried by the opposite wall and passing through the opening, whereby the catch is swung upward and outward for holding the bar in its raised position.

In testimony whereof I affix my signature in presence of two witnesses.

WILLIAM A. PINCKNEY.

Witnesses:
RUTH M. MILLER,
FRANK A. MILLER.